United States Patent [19]
Okada et al.

[11] Patent Number: 6,074,301
[45] Date of Patent: Jun. 13, 2000

[54] POWER TRANSMISSION MECHANISM

[75] Inventors: Masahiko Okada; Takashi Ban; Nobuaki Hoshino, all of Kariya; Yukiharu Yusa, Komagane, all of Japan

[73] Assignee: Kabushiki Kaisha Toyoda Jidoshokki Seisakusho, Aichi-Ken, Japan

[21] Appl. No.: 09/079,922

[22] Filed: May 15, 1998

[30] Foreign Application Priority Data

May 16, 1997 [JP] Japan ................................. 9-127320

[51] Int. Cl.$^7$ ....................................... F16D 7/02
[52] U.S. Cl. ................ 464/30; 464/57; 464/40; 464/77; 464/88; 192/56.2; 192/81 C
[58] Field of Search ................. 464/57, 30, 40, 464/61, 77, 87, 89, 92, 88, 93; 192/41.5, 56.2, 81 C

[56] References Cited

U.S. PATENT DOCUMENTS

| | | | |
|---|---|---|---|
| 1,126,780 | 2/1915 | Jones | 464/40 |
| 2,185,457 | 2/1940 | Conover | 464/40 |
| 2,257,987 | 10/1941 | Starkey | 192/74 |
| 2,396,985 | 3/1946 | Burrus | 192/41.5 |
| 2,510,644 | 6/1950 | McCormick | 464/40 |
| 2,541,947 | 2/1951 | Starkey | 192/56.2 |
| 2,595,454 | 5/1952 | Greenlee | 192/41 S |
| 2,794,524 | 6/1957 | Sacchini et al. | 192/41 S |
| 3,000,481 | 9/1961 | Tomko | 192/41 S |
| 3,465,857 | 9/1969 | Baer | 192/41 S |
| 5,088,832 | 2/1992 | Gambrill et al. | 366/314 |
| 5,391,058 | 2/1995 | Goto et al. | |

*Primary Examiner*—Anthony Knight
*Assistant Examiner*—Kenneth Thompson
*Attorney, Agent, or Firm*—Morgan & Finnegan, L.L.P.

[57] ABSTRACT

An improved apparatus for transmitting a rotational power from a pulley to a drive shaft of a compressor is disclosed. A coil spring is mounted on the drive shaft to absorb a load applied to the drive shaft when power is transmitted. The coil spring is arranged to be deformed upon generation of the load. A structure that transmits the power to the coil spring is securely attached to the pulley and coupled to the coil spring with a predetermined interference.

18 Claims, 7 Drawing Sheets

POWER TRANSMISSION MECHANISM

BACKGROUND OF THE INVENTION

The present invention relates to a power transmission mechanism such as that employed in a compressor to connect and disconnect the compressor to a power source.

Japanese Unexamined Patent Publication No. 8-121336 describes a typical power transmission mechanism for a compressor. As shown in FIG. 7, the compressor has a housing 102. An angular bearing 103 is fitted on the housing 102 to rotatably support a pulley 101 by way of a sleeve 105. A belt 104 connects the pulley 101 to a power source. The pulley 101 is connected to a drive shaft 108 by a rubber ring 107 and a coupling disk 106. The rubber ring 107 is adhered to the pulley 101 and to the coupling disk 106. The coupling disk 106 has a center bore 106a through which the drive shaft 108 is inserted. A nut 108a fastens one end of the drive shaft 108 to the coupling disk 106. A torsion spring 109 is arranged on the drive shaft 108. The spring 109 torsionally grips the drive shaft 108. The spring 109 has an end 110 that is received in an engaging recess 111 defined in the coupling disk 106.

The power source produces rotation that is constantly transmitted to the drive shaft 108 by way of the belt 104, the pulley 101, the sleeve 105, the rubber ring 107, the coupling disk 106, and the torsion spring 109. When the load applied to the drive shaft 108 becomes excessive, the spring 109 is twisted and deformed. This enlarges the diameter of the spring 109 and thus decreases the tightening force of the spring 109 with respect to the drive shaft 108. As a result, slippage occurs between the spring 109 and the drive shaft 108. Accordingly, the transmission of power from the power source to the drive shaft 108 is stopped when the load becomes excessive.

The rotation of the coupling disk 106 is transmitted to the spring end 110. The torsion spring 109 then transmits the rotation to the drive shaft 108. Therefore, the transmission of power from the pulley 101 to the drive shaft 108 pulls the spring end 110 and produces a bending force that is applied to the drive shaft 108. The bending force may result in radial loads acting on bearings and seals. This can lead to biased wear of these parts and may thus cause unstable rotation of the drive shaft 108 or degrade the sealing property of the seals.

To prevent a bending force from acting on the drive shaft 108 when the end of the torsion spring 110 is pulled, the spring end 110 and the engaging recess 111 must be formed with precision so as to restrict the movement of the spring end 110. However, this increases the production costs.

SUMMARY OF THE INVENTION

Accordingly, it is an objective of the present invention to provide a power transmission mechanism that suppresses the bending force acting on a rotating body with a simple structure and without increasing production costs.

To achieve the above objective, an improved apparatus for transmitting a rotational power from a pulley to a drive shaft of compressor will be proposed. The apparatus transmits a rotational power from a driving body to a driven body and includes a coil spring mounted on one of the bodies. The coil spring is arranged to be deformed upon generation of load when the power is transmitted. The apparatus further includes a means for transmitting the power to the coil spring. The transmitting means is securely attached to the other one of the bodies and coupled to the coil spring with a predetermined interference.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A first embodiment of a power transmission mechanism according to the present invention will now be described with reference to FIGS. 1 to 4. The power transmission mechanism is employed in a clutchless variable displacement compressor.

Figure 1:
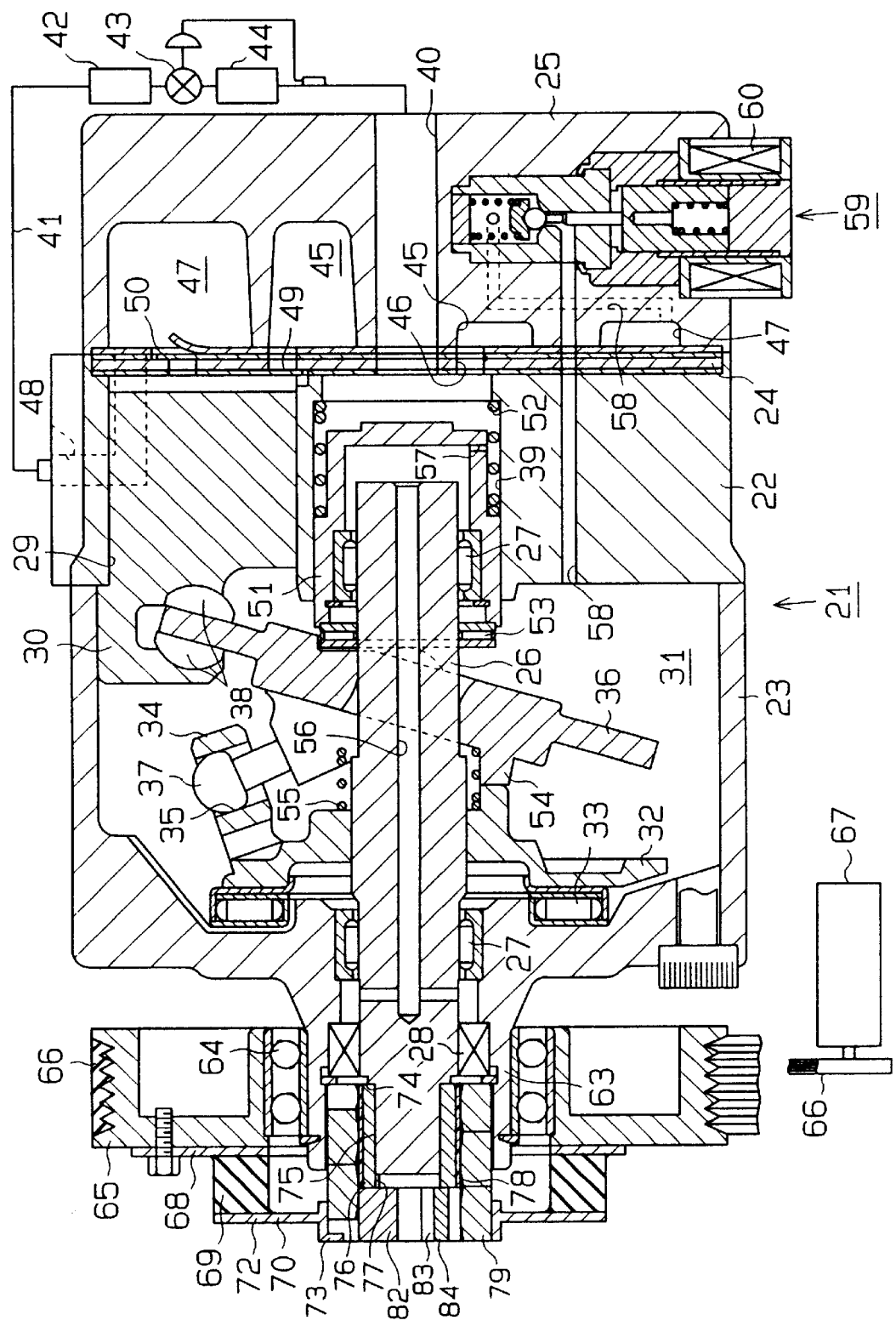
FIG. 1 is a cross-sectional view of a compressor employing a power transmission mechanism according to a first embodiment of the present invention.

As shown in FIG. 1, a compressor 21 includes a cylinder block 22, a front housing 23 coupled to the front end of the cylinder block 22, and a rear housing 25 coupled to the rear end of the cylinder block 22 by way of a valve plate 24.

A drive shaft 26 extends through the center of the cylinder block 22 and the front housing 23. The drive shaft 26 is rotatably supported by a pair of radial bearings 27. A lip seal 28 is arranged between the front end of the drive shaft 26 and the inner wall of the front housing 23.

Equally spaced cylinder bores 29 extend through the cylinder block 22 parallel to the drive shaft 26. A piston 30 is accommodated in each cylinder bore 29. A crank chamber 31 is defined in the front housing 23 in front of the cylinder block 22.

A rotor 32 is fitted on the drive shaft 26 in the crank chamber 31 so as to rotate integrally with the drive shaft 26. An arm 34 having a pair of guide bores 35 projects from the rotor 32.

A generally disk-like swash plate 36 is fitted on the drive shaft 26. A pair of coupling rods 37 having round ends extend from the front surface of the swash plate 36. Each coupling rod 37 is supported pivotally and slidably in either one of the guide bores 35 to rotate the swash plate 36 integrally with the drive shaft 26 while permitting inclination of the swash plate 36 with respect to the drive shaft 26.

Each piston 30 is connected to the peripheral portion of the swash plate 36 by a pair of semispherical shoes 38. When the rotation of the drive shaft 26 rotates the swash plate 36, each piston 30 is reciprocated in the associated cylinder bore 29.

A shutter chamber 39 extends through the center of the cylinder block 22 coaxially with the drive shaft 26. A suction passage 40 extends through the center of the rear housing 25 and the valve plate 24 coaxially with the drive shaft 26. The front end of the suction passage 40 is communicated with the shutter chamber 39. The rear end of the suction passage 40 is communicated with an external refrigerant circuit 41. The external refrigerant circuit 41 includes a condenser 42, an expansion valve 43, and an evaporator 44.

An annular suction chamber 45 is defined in the central portion of the rear housing 25. The suction chamber 45 is communicated with the shutter chamber 39 through a port 46. An annular discharge chamber 47 is defined in the peripheral portion of the rear housing 25. The discharge chamber 47 is connected to the external refrigerant circuit 41 through a discharge passage 48.

A suction valve mechanism 49 and a discharge valve mechanism 50 are provided on the valve plate 24 for each cylinder bore 29. When each piston 30 moves from the top dead center position to the bottom dead center position, refrigerant gas is drawn into the cylinder bore 29 through the associated suction valve mechanism 49. The refrigerant gas is then compressed as the piston 30 moves from the bottom dead center position to the top dead center position. When the pressure of the refrigerant gas reaches a predetermined value, the refrigerant gas is discharged into the discharge chamber 47 through the associated discharge valve mechanism 50.

A cylindrical shutter 51 is accommodated in the shutter chamber 39 coaxially with the drive shaft 26. The shutter 51 moves axially in the shutter chamber 39. A spring 52 is arranged between the shutter 51 and the rear wall of the shutter chamber 39 to urge the shutter 51 toward the swash plate 36. The rear end of the drive shaft 26 is held rotatably and slidably by a radial bearing 27 in the shutter 51. A thrust bearing 53 is slidably fitted on the drive shaft 26 between the shutter 51 and the swash plate 36.

The swash plate 36 inclines with respect to the drive shaft 26 between a minimum inclination position and a maximum inclination position. When the swash plate 36 is located at the minimum inclination position, the shutter 51 is moved against the force of the spring 52 to a closing position. In this state, the shutter 51 closes the suction passage 40 and impedes the flow of refrigerant gas from the external refrigerant circuit 41 to the suction passage 45. The inclination of the swash plate 36 with respect to a plane perpendicular to the axis of the drive shaft 26 when located at the minimum inclination position is slightly greater than zero degrees. Further inclination of the swash plate 26 from the minimum inclination position is restricted when the shutter 51 reaches the closing position.

When cooling becomes unnecessary, the swash plate 36 is moved to the minimum inclination position so that the compressor 21 continues operation. Accordingly, the drive shaft 26 of the compressor 21 is always connected to the power source without using a clutch. In other words, the compressor 21 is clutchless.

When the swash plate 36 is located at the maximum inclination position, the shutter 51 is moved forward to an opening position by the force of the spring 52. This opens the suction passage 40 and permits the flow of refrigerant gas from the external refrigerant circuit 41 to the suction chamber 45 by way of the suction passage 40, the shutter chamber 39, and the port 46. In this state, the compressor displacement is maximum. Further inclination of the swash plate 26 from the maximum inclination position is restricted when a projection 54 extending from the front surface of the swash plate 36 abuts against the rotor 32.

A spring 55 is arranged on the drive shaft 26 between the rotor 32 and the swash plate 36 to urge the swash plate 36 toward the minimum inclination position.

A relief passage 56 extends through the center of the drive shaft 26. The front end of the relief passage 56 is connected to the crank chamber 31. The rear end of the relief passage 56 is connected with the interior of the shutter 51. An aperture 57 extends through the cylindrical wall of the shutter 51. The interior of the shutter 51 is connected to the shutter chamber 39 through the aperture 57. The pressure in the crank chamber 31 is communicated to the suction chamber 45 through the relief passage 56, the interior of the shutter 51, the aperture 57, the shutter chamber 39, and the port 46.

A pressurizing passage 58 extends continuously through the rear housing 25, the valve plate 24, and the cylinder block 22 to connect the discharge chamber 47 to the crank chamber 31. An electromagnetic valve 59 having a solenoid 60 is arranged along the pressurizing passage 58 in the rear housing 25. The solenoid 60 is excited to close the electromagnetic valve 59 and de-excited to open the electromagnetic valve 59. When the electromagnetic valve 59 is opened, the pressure of the discharge chamber 47 is communicated to the crank chamber 31 through the pressurizing passage 58. This adjusts the pressure in the crank chamber 31.

A neck 63 is formed integrally with the front housing 23. An angular bearing 64 is fitted on the neck 63 and held slidably in the axial direction of the drive shaft 26. A pulley 65 is secured to the outer race of the angular bearing 64. The pulley 65 is arranged coaxially with the drive shaft 26 and connected to the power source, or engine 67, by a belt 66.

Figure 2:
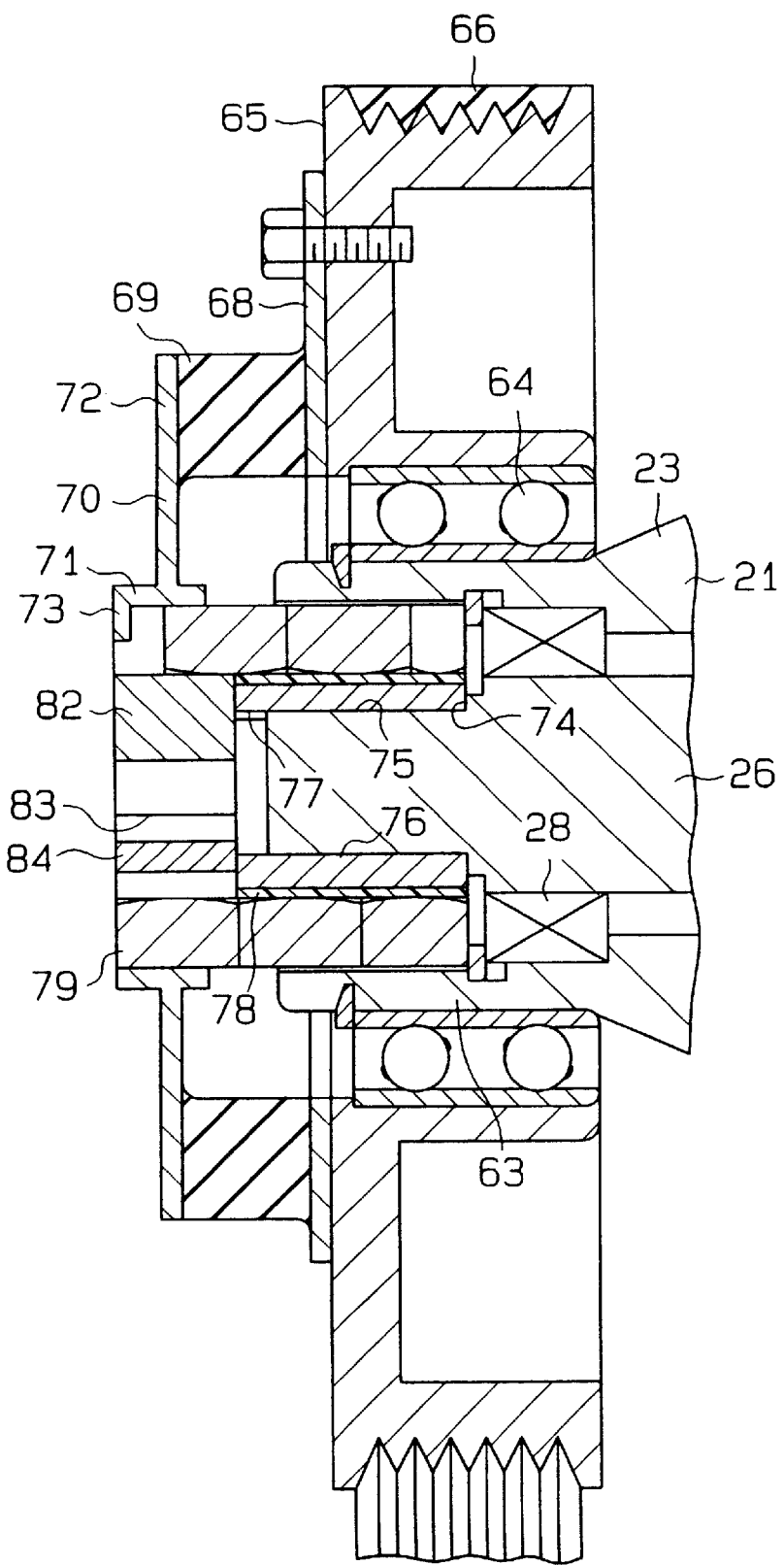
FIG. 2 is an enlarged cross-sectional view showing a cross-sectional view of the power transmission mechanism of FIG. 1.
Figure 3:
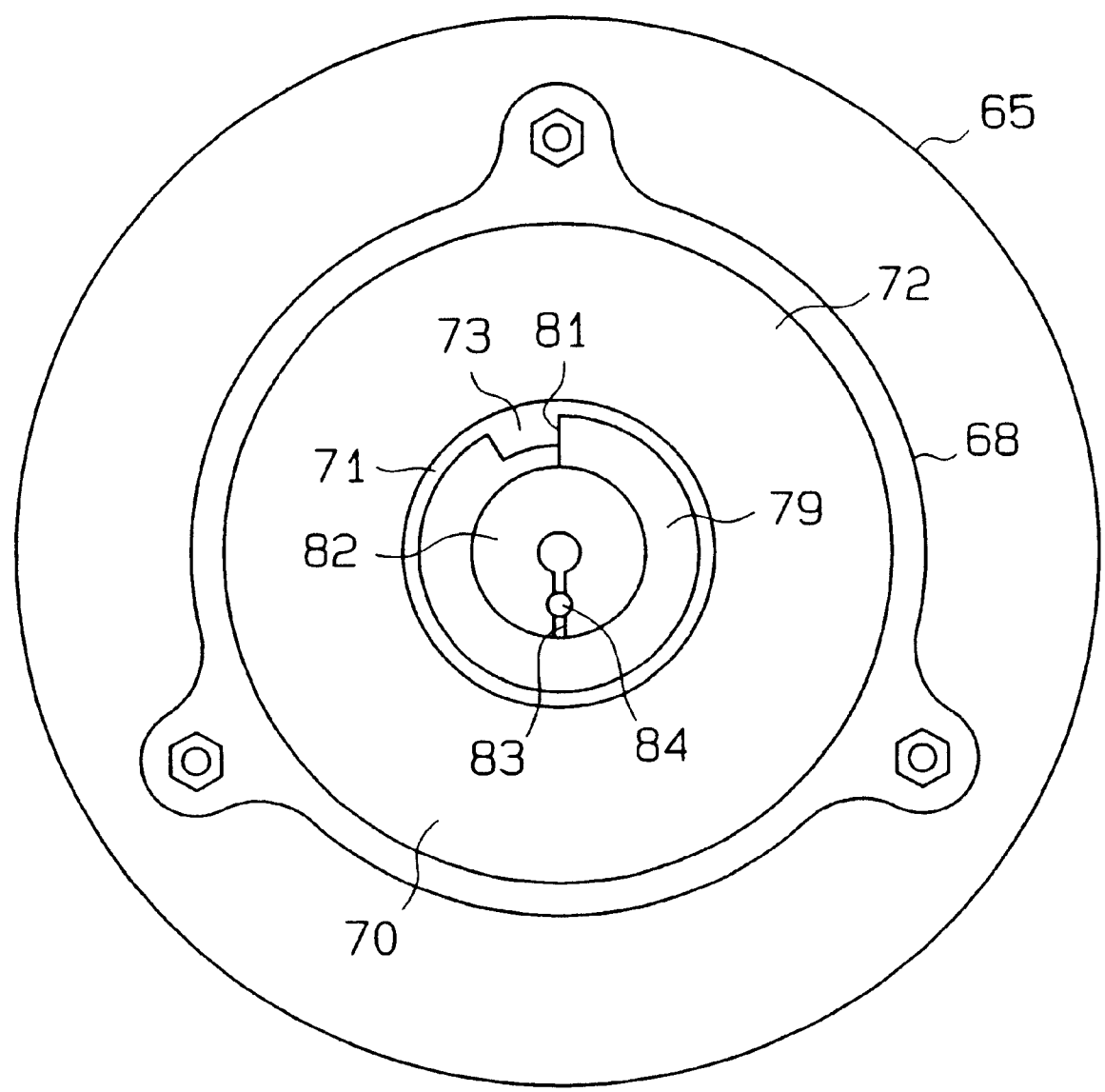
FIG. 3 is a front view schematically showing the power transmission mechanism.
Figure 4:
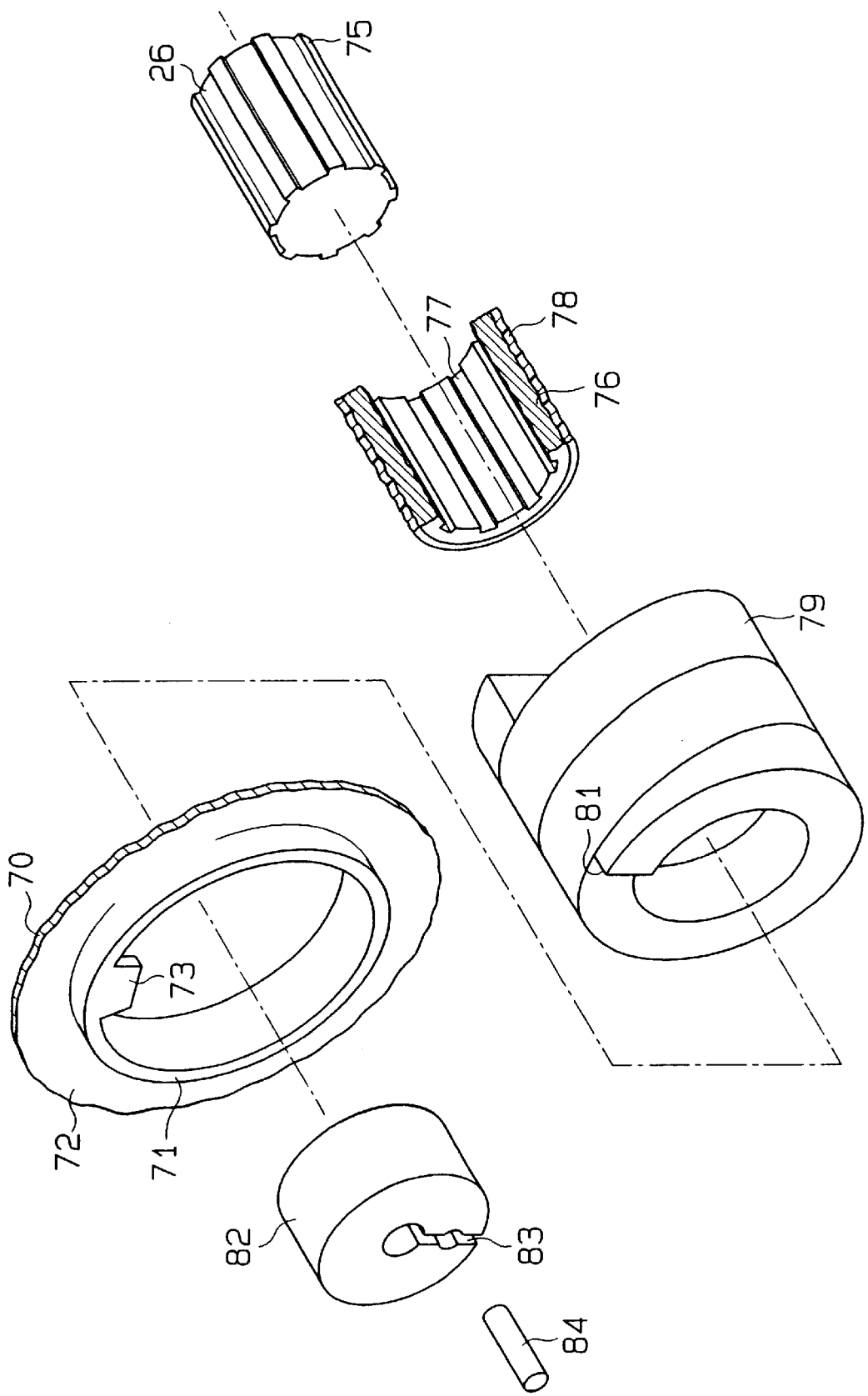
FIG. 4 is an explosive perspective view showing the power transmission mechanism.

As shown in FIGS. 2 to 4, a generally annular support plate 68 is fastened to the front side of the pulley 65 by a plurality of bolts. A rubber ring 69 is adhered to the front inner portion of the support plate 68. A coupling plate 70 is arranged in front of the rubber ring 69. The coupling plate 70 includes a tubular cylinder 71 and a flange 72 extending radially from the outer surface of the cylinder 71. The flange 72 is adhered to the front surface of the rubber ring 69. An engaging piece 73 is bent at the front end of the cylinder 71 so as to extend radially inward. The support plate 68, the rubber ring 69, and the coupling plate 70 are fixed to the pulley 65 so as to rotate integrally with the pulley 65.

A stepped portion 74 is defined at the front end of the drive shaft 26. The stepped portion 74 is a splined shaft 75. A cylindrical bushing 76 is fitted on the stepped portion 74. Keyways 77 extend along the inner surface of the bushing 76 to receive the splines of the splined shaft 75. A resin layer 78 is applied to the outer surface of the bushing 76. The resin layer 78 is made of a synthetic resin such as glass fiber, carbon fiber, talc, polyphenylene sulfide (PPS) containing inorganic matter such as clay, polyether ether ketone (PEEK), polyamide, polyimide, or epoxy resin.

A limit spring 79 is fitted on the bushing 76. The limit spring 79 is a coiled strand made of a material such as spring steel. Furthermore, the limit spring 79 is formed so that its inner diameter is smaller than the outer diameter of the bushing 76 when there is no force (load) applied to the spring 79. A torsion force is applied to the limit spring 79 to enlarge the spring diameter when fitting the spring 79 on the bushing 76. The torsion force is then eliminated to reduce the spring diameter and tighten the limit spring 79 around the bushing 76. The rear portion of the limit spring 79 is accommodated in the neck 63 of the front housing 23.

The front portion of the limit spring 79 is fitted in the cylinder 71 of the coupling plate 70. The limit spring 79 has a front end 81, which engages the engaging piece 73 of the cylinder 71. During rotation of the pulley 65, the engaging piece 73 rotates the limit spring 79 integrally with the coupling plate 70. Furthermore, the engaging piece 73 restricts the axial movement of the limit spring 79 and thus prevents the spring 79 from falling off the drive shaft 26.

A cylindrical core 82 is fitted in the front end of the limit spring 79. The core 82 has a diameter that is slightly smaller than the inner diameter of the limit spring 79. A slit 83 extends radially through the core 82. Thus, the core 82 has a C-shaped cross-section. A pin 84 is pressed into the slit 83 to widen the slit 83. This expands the core 82 and presses the outer surface of the core 82 against the inner surface of the limit spring 79. As a result, the front portion of the limit spring 79 is expanded and the outer surface of the limit spring 79 is pressed against the inner surface of the cylinder 71 of the coupling plate 70. Accordingly, the coupling plate 70 and the limit spring 79 are frictionally coupled to each other along substantially the entire circumference of the front end of the spring 79. The expanded core 82 creates a predetermined amount of interference between the coupling plate 70 and the spring 79.

The coiled strand of the limit spring 79 is wound from the front end 81 in the same direction as the rotating direction of the pulley 65 and the drive shaft 26. Thus, when a load acts on the limit spring 79 by way of the drive shaft 26 and the bushing 76 in a direction opposite to the pulley rotating direction, the limit spring 79 is twisted and deformed. This enlarges the inner diameter of the limit spring 79 and decreases the force that tightens the limit spring 79 to the bushing 76.

As shown in FIGS. 1 to 3, under normal operating conditions, the power of the engine 67 is transmitted to the drive shaft 26 by way of the belt 66, the pulley 65, the support plate 68, the rubber ring 69, the coupling plate 70, the limit spring 79, and the bushing 76.

The operation of the compressor 21 will now be described.

In the state shown in FIG. 1, the solenoid 60 is excited to close the electromagnetic valve 59. This closes the pressurizing passage 58 and stops the high pressure refrigerant gas in the discharge chamber 47 from entering the crank chamber 31 through the pressurizing passage 58. However, the refrigerant gas in the crank chamber 31 continues to flow into the suction chamber 45 through the relief passage 56, the interior of the shutter 51, the aperture 57, the shutter chamber 39, and the port 46. Accordingly, the pressure in the crank chamber 31 decreases to a level close to the low pressure in the suction chamber 45. This moves the swash plate 36 to the maximum inclination position. At this position, the compressor displacement is maximum.

When the cooling load falls as the compressor continues maximum displacement operation, the temperature of the evaporator 44 in the external refrigerant circuit 41 gradually decreases. When the temperature falls to a value at which frost starts to form, the solenoid 60 is de-excited to open the electromagnetic valve 59. This permits the high pressure refrigerant gas in the discharge chamber 47 to flow into the crank chamber 31 through the pressurizing passage 58 and increase the pressure in the crank chamber 31.

Consequently, the swash plate 36 moves from the maximum inclination position toward the minimum inclination position.

As the inclination of the swash plate 36 decreases, the thrust bearing 53 moves the shutter 51 against the urging force of the spring 52 to the rear and toward the closing position. When the shutter 51 reaches the closing position, the rear end of the shutter 51 abuts against the wall about the opening of the suction passage 40. Thus, the shutter 51 closes the suction passage 40 and impedes the flow of refrigerant gas from the external refrigerant circuit 41 to the suction chamber 45.

The minimum inclination of the swash plate 36 is slightly greater than zero degrees. Therefore, when the swash plate 36 is located at the minimum inclination position, refrigerant gas is continuously discharged into the discharge chamber 47 from the cylinder bores 29 and the compressor is operated in a minimum displacement state. The gas in the discharge chamber 47 flows into the crank chamber 31 through the pressurizing passage 58. The gas then flows through the relief passage 56, the interior of the shutter 51, the aperture 57, the shutter chamber 39, the port 46, and into the suction chamber 45 to be drawn into the cylinder bores 29 again. In other words, an internal refrigerant circuit is formed in the compressor 21 when the swash plate 36 is located at the minimum inclination position.

When the need for cooling increases as the compressor continues minimum displacement operation, the temperature of the evaporator 44 in the external refrigerant circuit 41 gradually increases. When the temperature exceeds a predetermined value, the solenoid 60 is excited to close the electromagnetic valve 59. This stops the high pressure refrigerant gas in the discharge chamber 47 from flowing into the crank chamber 31 through the pressurizing passage 58. However, the refrigerant gas in the crank chamber 31 flows into the suction chamber 45 through the relief passage 56, the interior of the shutter 51, the aperture 57, the shutter chamber 39, and the port 46. This gradually decreases the pressure in the crank chamber 31 and moves the swash plate 36 from the minimum inclination position toward the maximum inclination position.

As the inclination of the swash plate 36 increases, the force of the spring 52 moves the shutter 51 forward and separates the rear end of the shutter 51 from the wall about the opening of the suction passage 40. Thus, the shutter 50 opens the suction passage 40 and commences the flow of refrigerant gas from the external refrigerant circuit 41 to the suction chamber 45.

The compressor 21 stops operation when the engine 67 is stopped. In such state, the electromagnetic valve 59 is opened and the swash plate 36 is held at the minimum inclination position.

The operation of the power transmission mechanism will now be described.

Under normal conditions, the power of the engine 67 is transmitted to the drive shaft 26 by way of the belt 66, the pulley 65, the support plate 68, the rubber ring 69, the coupling plate 70, the limit spring 79, and the bushing 76.

During power transmission to the compressor 21, a load acting in a direction opposite the rotating direction of the pulley 65 is applied to the drive shaft 26. The magnitude of the load depends on the operating conditions of the compressor 21. The load twists and deforms the limit spring 79.

However, the limit spring 79 continues to tightly hold the bushing 76 until the twisting force of the limit spring 79 exceeds the opposite tightening force of the limit spring 79.

Accordingly, power transmission from the pulley 65 to the drive shaft 26 continues as long as the load is less than a certain magnitude.

The coupling plate 70 is fixed to and rotated integrally with the pulley 65. Furthermore, the coupling plate 70 and the limit spring 79 are frictionally coupled to each other about the circumference of the spring 79. This structure prevents the limit spring 79 from bending the drive shaft 26 during power transmission. Therefore, the application of bending forces on the drive shaft 26 is eliminated.

If the load level becomes excessive due to an abnormality in the compressor, the load counteracts the tightening force of the limit spring 70. As a result, friction between the limit spring 79 and the bushing 76 is reduced thereby causing the limit spring 79 to release the bushing 76. Furthermore, the expanded front end 81 of the limit spring 79 restricts relative rotation between the limit spring 79 and the coupling plate 70. Thus, slippage occurs between the limit spring 79 and the bushing 76. This stops the transmission of power from the pulley 65 to the drive shaft 26. The slippage of the limit spring 79 along the outer surface of the bushing 76 during rotation produces friction heat. The heat deforms the resin layer 78 and reduces the diameter of the outer diameter of the bushing 76. If this state continues, the outer diameter of the bushing 76 becomes substantially the same as the inner diameter of the limit spring 79 when the spring 79 is free of load. Consequently, the limit spring 79 starts to rotate freely with respect to the bushing 76.

The advantages described below are obtained in this embodiment.

When transmitting power, the limit spring 79 does not bend the end of the drive shaft 26. Thus, no bending force is applied to the drive shaft 26. This reduces biased wear of the radial bearing 27 and the lip seal 28 caused by a biased load. This prevents unstable rotation of the drive shaft 26. Furthermore, the crank chamber 31 remains securely sealed. Therefore, the compressor is more stable and the possibility that refrigerant gas might leak from the compressor 21 is reduced.

In this embodiment, the present invention is applied to a compressor that varies displacement by adjusting the pressure in the crank chamber 31. Therefore, sealing of the crank chamber 31 is especially important. Accordingly, the power transmission mechanism of this embodiment is preferred for variable displacement compressors.

In addition, the drive shaft 26 of the compressor 21 is constantly connected to the engine 67, which serves as a power source, without using a clutch. In the clutchless compressor 21, the drive shaft 26 continues rotation when cooling is not required. In this state, the compressor displacement is minimum. To continue operation in the minimum displacement state, the crank chamber 31 must be sealed. Accordingly, the power transmission mechanism of this embodiment is preferred for clutchless variable displacement compressors.

In this embodiment, the core 82, which is arranged in the front end of the limit spring 79, is expanded to enlarge the diameter of the limit spring 79. This presses the outer surface of the limit spring 79 against the inner surface of the cylinder 71 of the coupling plate 70. Accordingly, the limit spring 79 and the cylinder 71 are coupled to each other circumferentially. Furthermore, the core 82 is expanded by pressing the pin 84 into the slit 83 of the core 82. Thus, the coupling between the limit spring 79 and the coupling plate 70 is achieved with a simple structure. In addition, the coupling plate 70, the limit spring 79, the core 82, the slit 83, and the pin 84 need not be machined with high precision, which decreases machining costs. The diameter of the pin 84 may be selected arbitrarily to compensate for the dimensional margins produced during assembly.

In this embodiment, the engaging piece 73 located at the front end of the cylinder 71 engages the front end 81 of the limit spring 79. This engagement, together with the coupling relationship between the coupling plate 70 and the limit spring 79, further enhances the transmission of power from the pulley 65 to the drive shaft 26.

When the load acting on the drive shaft 26 becomes greater than the predetermined value, the limit spring 79 loosens. This causes slippage between the limit spring 79 and the bushing 76. However, the engaging piece of the coupling plate 70 restricts forward movement of the limit spring 79. This prevents the limit spring 79 from falling off the drive shaft 26.

A second embodiment according to the present invention will now be described with reference to FIGS. 5 and 6. The structure for coupling the coupling plate 70 and the limit spring 79 to each other differs from that of the first embodiment.

Figure 5:
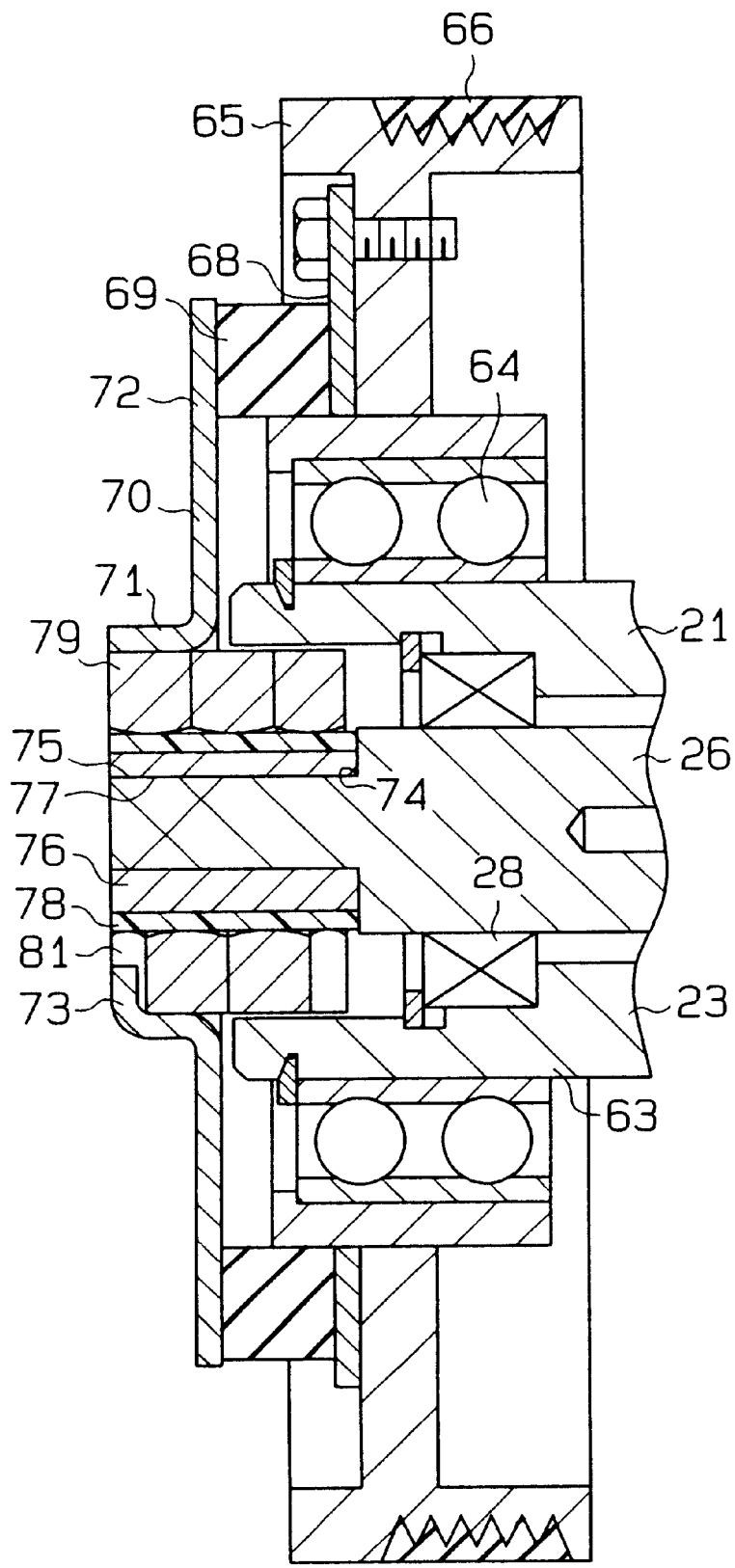
FIG. 5 is a cross-sectional view showing a power transmission mechanism according to a second embodiment of the present invention.
Figure 6:
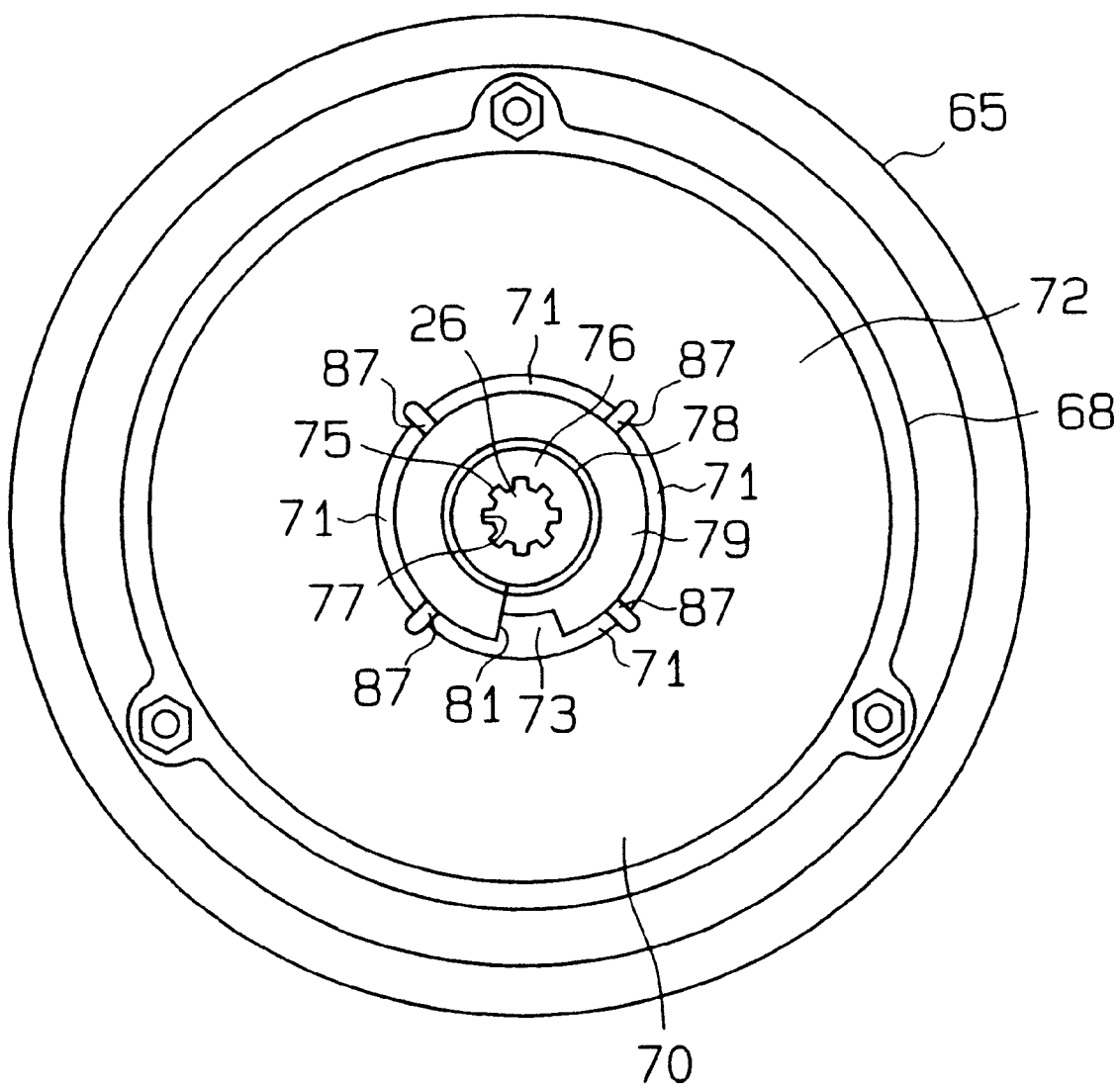
FIG. 6 is a front view schematically showing the power transmission mechanism.
Figure 7:
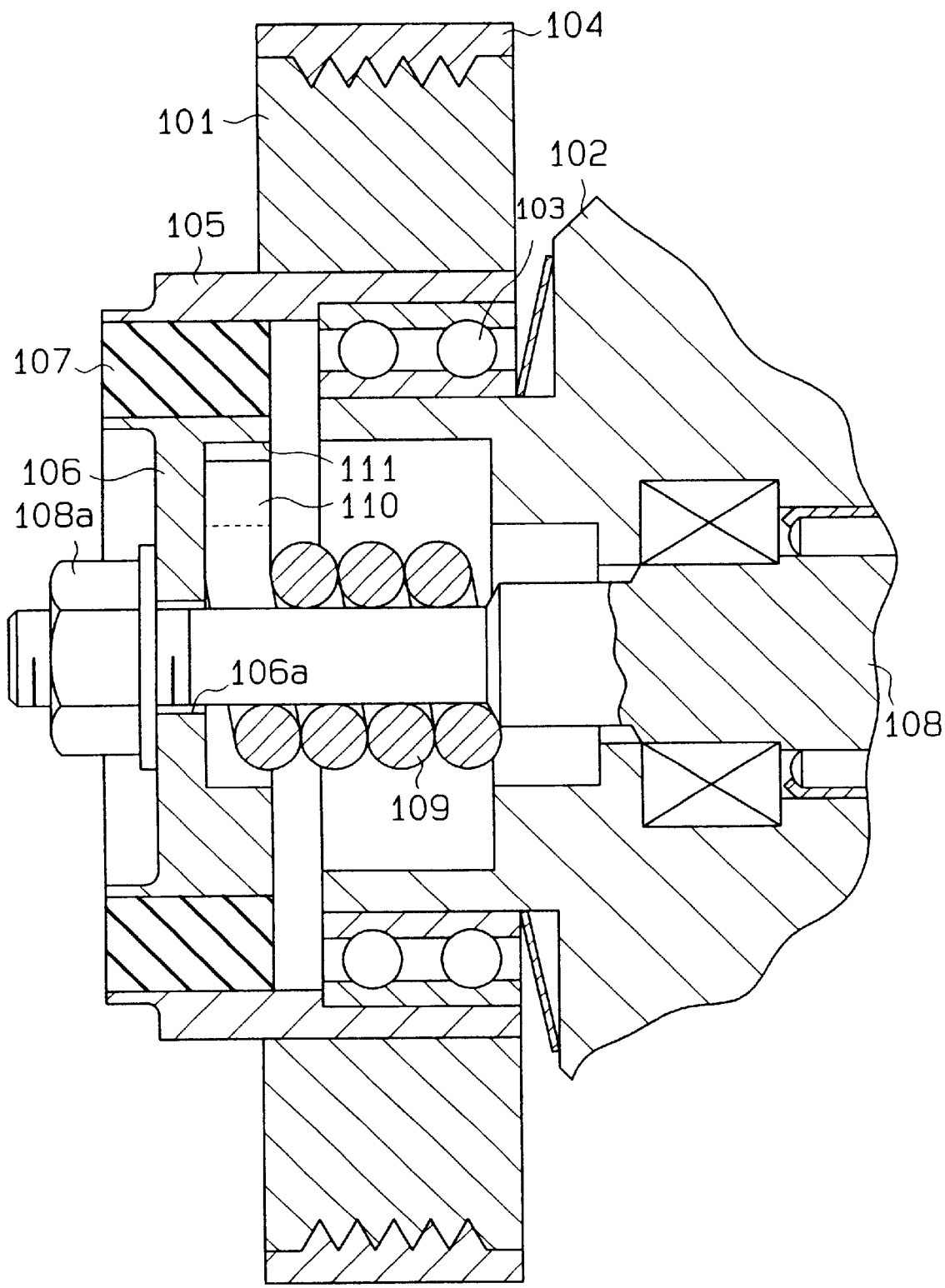
FIG. 7 is a cross-sectional view showing a prior art power transmission mechanism.

As shown in FIGS. 5 and 6, the limit spring 79 is pressed into the cylinder 71 of the coupling plate 70. Thus, the limit spring 79 and the cylinder 71 are frictionally coupled to each other. There is a predetermined amount of interference between the spring 79 and the cylinder 71. In this embodiment, the coupling plate 70 may be formed by pressing a single sheet of metal. Slits 87 are formed to extend axially in the cylinder 71 so as to partition the cylinder 71 into a plurality of sections.

The second embodiment obtains the advantages described below in addition to the advantages of the first embodiment.

The core 82 is not employed in this embodiment. This reduces the number of parts and further simplifies the structure of the power transmission mechanism. Since the diameter of the limit spring 79 need not be enlarged by the core 82, the axial length of the limit spring 79 is shortened. This lightens the power transmission mechanism. The slits 87 provided in the cylinder 71 of the coupling plate 70 increase the radial expandability of the cylinder 71. This facilitates the pressing of the limit spring 79 into the cylinder 71 and improves efficiency when assembling the limit spring 79 to the power transmission mechanism.

In the power transmission mechanism of the second embodiment, the coupling plate 70 is formed by pressing a single sheet of metal. This facilitates the formation of the coupling plate 70.

It should be apparent to those skilled in the art that the present invention may be embodied in many other specific forms without departing from the spirit or scope of the invention. More particularly, the present invention may be embodied in the modes described below.

In the first and second embodiments, the resin layer 78 applied to the outer surface of the bushing 76 may be eliminated. In this case, the bushing 76 is formed having an outer diameter that is larger than the inner diameter of the limit spring 79 when the spring 79 is free from load.

In the first embodiment, the diameter of the limit spring 79 may be enlarged by using means other than the core 82. For example, the diameter of the limit spring 79 may be enlarged by screwing a bolt or pressing a pin into the front end of the limit spring 79. Such structure would simplify the power transmission mechanism.

In the first embodiment, the core 82 may be enlarged by screwing a bolt or pressing a pin into the center of the core 82. The core 82 may also be enlarged by screwing a bolt into the slit 83 of the core 82.

In the first embodiment, the coupling plate 70 may be formed by pressing a single sheet of metal.

In any of the above embodiments, the drive shaft 26 may be connected directly to the power source by a belt or the like.

In any of the above embodiments, the engaging piece 73 may be eliminated from the front end of the coupling plate cylinder 71.

In any one of the above embodiments, the limit spring may be formed from a plurality of parallel coiled strands in a multiple thread like manner. In this case, the coupling plate 70 may be provided with an engaging piece 73 for each strand.

Therefore, the present examples and embodiments are to be considered as illustrative and not restrictive and the invention is not to be limited to the details given herein, but may be modified within the scope and equivalence of the appended claims.

What is claimed is:

1. An apparatus for transmitting rotational power from a driving body to a driven body, said apparatus comprising:

a coil spring mounted on one of the bodies and coupled to said body with a predetermined interference, said coil spring being arranged to radially enlarge and thereby reduce the interference between said coil spring and said body to allow relative rotation between said coil spring and said body when a load acting on said coil spring by way of said body is larger than a predetermined value; and means for transmitting the rotational power to the coil spring, said transmitting means being securely attached to the other one of the bodies and coupled to the coil spring with a predetermined interference.

2. The apparatus as set forth in claim 1, wherein said transmitting means includes a substantially cylindrical portion that receives a portion of the coil spring.

3. The apparatus as set forth in claim 2, further comprising means for enlarging a diameter of the coil spring so as to ensure a close contact of the coil spring with the transmitting means.

4. The apparatus as set forth in claim 3, wherein said enlarging means includes an annular member fitted within the coil spring, and wherein said annular member has a slit.

5. The apparatus as set forth in claim 4, wherein said enlarging means includes a pin that is forcibly inserted into the slit so as to increase the circumferential length of the annular member.

6. The apparatus as set forth in claim 5, further comprising restricting means for restricting a rotational movement of the coil spring that is subject to the rotation of the bodies.

7. The apparatus as set forth in claim 6, wherein said restricting means functions as a stopper that restricts a movement of the coil spring toward the transmitting means.

8. An apparatus for transmitting rotational power from an actuator to a drive shaft via a rotary body, said apparatus comprising:

a coil spring mounted on the drive shaft and coupled to the drive shaft with a predetermined interference, said coil spring being arranged to radially enlarge and thereby reduce the interference between the coil spring and the drive shaft to allow relative rotation between the coil spring and the drive shaft when a loan acting on the coil spring by way of the drive shaft is larger than a predetermined value; and means for transmitting the rotational power to the coil spring, said transmitting means being securely attached to the rotary body and coupled to the coil spring with a predetermined interference.

9. The apparatus as set forth in claim 8, further comprising a bushing mounted on the drive shaft, said bushing being made of a wear-oriented synthetic resin, wherein said coil spring is wound on the bushing, and wherein said bushing is worn when the coil spring is subject to the excessive load.

10. The apparatus as set forth in claim 9, wherein said bushing is unrotatably and axially movably mounted on the drive shaft.

11. The apparatus as set forth in claim 10, wherein said transmitting means includes a substantially cylindrical portion that receives a portion of the coil spring.

12. The apparatus as set forth in claim 11, further comprising means for enlarging a diameter of the coil spring so as to ensure a close contact of the coil spring with the transmitting means.

13. The apparatus as set forth in claim 12, wherein said enlarging means includes an annular member fitted within the coil spring, and wherein said annular member has a slit.

14. The apparatus as set forth in claim 13, wherein said enlarging means includes a pin that is forcibly inserted into the slit so as to increase the circumferential length of the annular member.

15. The apparatus as set forth in claim 14, further comprising restricting means for restricting a rotational movement of the coil spring that is subject to the rotation of the body and drive shaft.

16. The apparatus as set forth in claim 15, wherein said restricting means functions as a stopper that restricts a movement of the coil spring toward the transmitting means.

17. The apparatus as set forth in claim 16, wherein said actuator includes an engine, and wherein said rotary body includes a pulley indirectly actuated by the engine.

18. An apparatus for transmitting rotational power from an engine to a drive shaft via a rotary body, wherein a load applied to the drive shaft is absorbed by the coil spring mounted on the drive shaft and coupled to the drive shaft with a predetermined interference, said apparatus comprising:

said coil spring being arranged to radially enlarge and thereby reduce the interference between the coil spring and the drive shaft to allow relative rotation between the coil spring and the drive shaft when the load is larger than a predetermined value; and an assembly interposed between the rotary body and the coil spring for transmitting the rotational power to the coil spring from the rotary body, said assembly being securely attached to the rotary body and coupled to the coil spring with a predetermined interference.

* * * * *

UNITED STATES PATENT AND TRADEMARK OFFICE
CERTIFICATE OF CORRECTION

PATENT NO.   :   6,074,301
DATED        :   June 13, 2000
INVENTOR(S)  :   Masahiko Okada et al.

It is certified that error appears in the above-identified patent and that said Letters Patent is hereby corrected as shown below:

Title page, first column, under "[73] Assignee:", add as a joint assignee:

--NHK Spring Co., Ltd., Kanagawa, Japan--

Signed and Sealed this

Eighth Day of May, 2001

Attest:

NICHOLAS P. GODICI

Attesting Officer        Acting Director of the United States Patent and Trademark Office